United States Patent [19]
Hobbs

[11] Patent Number: 5,979,242
[45] Date of Patent: Nov. 9, 1999

[54] MULTI-LEVEL VIBRATION TEST SYSTEM HAVING CONTROLLABLE VIBRATION ATTRIBUTES

[75] Inventor: Gregg K. Hobbs, Westminster, Colo.

[73] Assignee: Hobbs Engineering Corporation, Westminster, Colo.

[21] Appl. No.: 09/063,157

[22] Filed: Apr. 20, 1998

[51] Int. Cl.[6] .................................................. G01M 7/06
[52] U.S. Cl. .............................................. 73/663; 73/666
[58] Field of Search ........................... 73/662, 663, 665, 73/666, 667, 668

[56] References Cited

U.S. PATENT DOCUMENTS

| | | | |
|---|---|---|---|
| 2,706,400 | 4/1955 | Unholtz | 73/666 |
| 3,369,393 | 2/1968 | Farmer | 73/71.6 |
| 3,686,927 | 8/1972 | Scharton | 73/665 |
| 4,164,151 | 8/1979 | Nolan et al. | 73/663 |
| 4,181,028 | 1/1980 | Talbott, Jr. | 73/665 |
| 4,735,089 | 4/1988 | Baker et al. | 73/663 |
| 5,024,096 | 6/1991 | Gregory et al. | 73/662 |
| 5,365,788 | 11/1994 | Hobbs | 73/665 |
| 5,412,991 | 5/1995 | Hobbs | 73/663 |
| 5,594,177 | 1/1997 | Hanse | 73/663 |
| 5,726,361 | 3/1998 | Ogawa | 73/662 |

FOREIGN PATENT DOCUMENTS

1269854  11/1986  U.S.S.R. ................. 73/667

Primary Examiner—Herzron Williams
Assistant Examiner—Helen C. Kwok
Attorney, Agent, or Firm—Duft, Graziano & Forest, PC

[57] ABSTRACT

The multi-level vibration test system has controllable vibration attributes that enable the test engineer to precisely implement a vibration environment that is applicable to a wide range of applications and performance characteristics. The multi-level vibration test system comprises a plurality of shaker modules that are interconnected by coupling modules and optionally includes vibration input elements and/or vibration shaping elements that collectively function to enable the user to program the frequency and magnitudes that are produced by the multi-level vibration system. This novel architecture as well as the numerous implementation variations that are possible using this architecture, enable the test engineer to precisely control the vibration frequencies and magnitudes that are produced.

32 Claims, 5 Drawing Sheets

MULTI-LEVEL VIBRATION TEST SYSTEM HAVING CONTROLLABLE VIBRATION ATTRIBUTES

FIELD OF THE INVENTION

This invention relates to vibration systems that are used to test the vibration resilience of products and, in particular, to a multi-level vibration test system that has controllable vibration attributes to thereby enable the test engineer to precisely create a desired vibration environment to emulate the environment that the product will encounter or to precipitate and detect flaws that could cause failures in the field.

PROBLEM

It is a problem in the field of test systems to ensure that the conditions that a product encounters during shipping, installation and use will not cause it to fail in its operation. One reason for this problem is that it is impossible to reproduce these real world conditions in a laboratory environment. The laboratory equipment that are used for testing include vibration systems, commonly known as shaker tables, that emulate the vibration conditions encountered by the product. It is also common to locate the shaker table within a thermal chamber to incorporate thermal cycling of the product into the vibration test.

The basic shaker table includes a platform upon which the product is mounted. The platform is supported on flexible supports that permit the vibration of the table freely in all directions, independent of the environment. The shaker table generates vibration in six axes by providing either pneumatically driven or mechanically driven actuators, termed exciters or vibrators, that produce an impact to initiate the vibrations. The platform couples the vibrations from the actuators to the product. The typical actuator is an impact device that produces forces of high magnitude but very short duration. It is well known that short duration, high magnitude pulses in the time domain translate into broadband vibration spectra in the frequency domain. Thus, the actuators provide the input vibration stimulus for use by the shaker table in the desired manner. The physical properties of the shaker table components cause the shaker table to respond to the different frequencies in the impact spectrum in different ways. The physical properties of the shaker table components typically resonate with certain vibration frequencies and suppress other vibration frequencies to result in selected modes of vibration. For example, resonation results in the vibrations remaining for a relatively long time compared to the duration of the input pulse, while suppression results in the quenching of the vibration in a relatively short time. The modes of vibration of the shaker table are also a function of the location, orientation and nature of the actuators as well as the dimensions and properties of the platform.

This shaker table architecture is well known and the great difficulty facing the test engineers in this field is the implementation of the shaker table in a manner to precisely produce the desired vibration conditions in terms of the presence of selected vibration frequencies and regulation of their magnitude. There are obviously numerous variables, each of which effects the magnitude and frequency of the vibrations that are produced. These variables include but are not limited to: number of actuators, actuator placement, actuator characteristics, frequency of actuator operation, physical coupling of the actuator to the shaker table platform, coupling of the product to the shaker table platform, damping elements included in the shaker table, dimensions of the shaker table, shaker table implementation, including materials and intervening structures. A further complicating factor is that these variables can also be interactive, in that the variation of one variable can impact the effects produced by another variable. Thus, the design of a shaker table is a non-trivial task and typically represents a compromise that produces a crude emulation of the desired vibration characteristics. The quest for accuracy in this field is ongoing and has been relatively unsuccessful to date. The following recitation of typical shaker table implementations represents a sampling of the many attempts to address the above-noted problem.

U.S. Pat. No. 3,369,393, issued to E. W. Farmer, discloses a light weight, stiff test fixture that comprises upper and lower plates that are separated by perpendicular vertical walls. The walls are arranged on a horizontal grid pattern to form cells that can have different horizontal dimensions. The lower plate is attached to an actuator that provides the input to generate the shaking motion of the table. The upper plate provides the mounting surface on which the product is mounted. This fixture provides a dynamically stiff coupling between the upper and lower plates over a frequency range of interest.

U.S. Pat. No. 3,686,927, issued to Terry D. Scharton, discloses a light weight, flexible test fixture that comprises upper and lower plates that are coupled by a system of flexible members. The lower plate is attached to an actuator that provides the input to generate the shaking motion of the table. The upper plate provides the mounting surface on which the product is mounted. The flexible members are interposed between the upper and lower plates to provide a desired dynamic coupling function between the upper and lower plates over a frequency range of interest. The flexible members can be systems of wires, beams, plates, trusses and the like.

U.S. Pat. No. 4,164,151, issued to Douglas C. Nolan et al, discloses a shaker table that has a hollow top. The table is comprised of a plurality of compartments that contain projectiles, such as heavy balls, that impact the walls of their respective compartments to generate random shocks. The table rests on an insulated base, which in turn rests on a vibration machine. The table top is bolted through the insulated base to the vibration machine.

U.S. Pat. No. 4,181,028, issued to C. F. Talbott, Jr, describes a vibration system that consists of a driving structure and a driven structure, which are both coupled to a viscoelastic structure that transmits the vibrations from the driving structure to the driven structure. There are a number of ways of clamping the driving and driven structures as well as varying the stiffness and damping characteristics of the visco-elastic structure.

U.S. Pat. No. 4,735,089, issued to Richard L. Baker, discloses a shaker table that comprises upper and lower plates that are interconnected by an intervening plurality of damping layers. The damping layers comprise laminated layers of honeycomb material bonded together by a flexible adhesive to thereby provide dynamic coupling.

U.S. Pat. Nos. 5,365,788 and 5,412,991, issued to Gregg K Hobbs, disclose a stiff shaker table that comprises a stiff plate having multiple internal weight reducing cavities.

Screening Systems Inc. manufactures a modally rich, heavily damped six axis system. This shaker table is flexible and responds to a series of impacts from pneumatically driven actuators. This system is designed to generate a midrange vibration spectrum which is strong from about 200 Hz to about 800 Hz. It has little lower and higher vibration frequencies and therefore cannot excite the very low and very high vibration frequencies of the product under test. Also, this system has little or no spectrum control over most of the frequency range and cannot effectively utilize large rigid fixtures as the system is made to be flexible.

QualMark Corporation manufactures a broad band six axis vibration system which is inertially actuated by pneumatically driven actuators. This vibration system produces vibration frequencies at the repetition rate of the vibrators (in the less than 60 Hz range) and all harmonics of the repetition rate up to about 800 Hz where table resonances start to be significant and where the vibration frequencies then increase by several orders of magnitude. The vibration frequency spectra that are produced by this vibration system are strongest from about 800 Hz up to about 5,000 Hz. A reasonable vibration frequency spectra below 800 Hz exists, but the magnitude of this vibration frequency spectra is inadequate to excite the low frequency resonances of the product under test to a desirable level. This vibration system also has little of no spectral control over most of the vibration frequency range.

Team Corporation manufactures a "Cube" vibration system that is servo-hydraulically actuated. The bandwidth of the vibration frequencies that are produced by this vibration system is approximately from 0–200 Hz. Due to the character of the servo-hydraulic actuation and the oil column resonance, higher frequencies of vibration are not possible. The servo-hydraulic system concept has several desirable characteristics, including very large magnitude forces and large displacements. These vibration systems also have spectrum control to a large degree.

Some six axis electro dynamic vibration systems exist, but complexity, cost, reliability and the need for a large magnetic field prevent their successful use in test environments that require little or no magnetic field. In most vibration test applications, an electronic magnetic field causes the product under test to be microphonic and therefore unable to be tested electrically in a meaningful way during the vibration test cycle. The electro dynamic shaker systems usually have excellent spectrum control.

Thus, while there exist numerous variations of shaker tables, each implementation presents limitations that prevent the test engineer from effecting precise control over the vibration frequencies and magnitudes to thereby precisely emulate the environment that the product under test will encounter or the environment desired for simulation.

Solution

The above described problems are solved and a technical advance achieved by the present multi-level vibration test system having controllable vibration attributes that enable the test engineer to precisely implement a vibration environment that is applicable to a wide range of applications and performance characteristics. The multi-level vibration test system comprises a plurality of shaker modules that are interconnected by coupling modules and optionally includes vibration input elements and/or vibration shaping elements that collectively function to enable the user to program the frequency and magnitudes that are produced by the multi-level vibration system. This novel architecture as well as the numerous implementation variations that are possible using this architecture, enable the test engineer to precisely control the vibration frequencies and magnitudes that are produced.

This is accomplished in one embodiment by the use of a "primary" shaker module that is a low frequency six (or less) axis vibration system excited by pneumatics, servo-hydraulics, electro-dynamics or mass imbalance, to which is coupled a "secondary" shaker module. The two shaker modules are interconnected by a coupling module that comprises springs, and pneumatic, hydraulic, electrodynamic or elastomeric elements. The secondary shaker module, which can be thought of as a plate, is equipped with apparatus that provides a direct excitation as well as passive vibration shaping to the suspended secondary shaker module. This additional excitation can be inertially induced in the following ways: 1) attach pneumatic actuators to the secondary shaker module and provide impacts which are shaped in the time domain by programmers, 2) provide imbalanced rotating parts and 3) provide a series of impacts by mechanical means such as masses impacting on the table, while the passive vibration shaping is accomplished by: 1) provide tuned absorbers which respond to frequencies mostly near their natural frequency and then, when the response displacement is sufficient, impact the secondary shaker module causing broad band vibration to be generated by the series of impacts, and 2) provide balls and programmers in a cavity.

The high frequency portion of the excitation to the product under test is provided by the secondary shaker module being directly excited and is effectively isolated from the base of the primary shaker module by the fact that the primary spring/mass system has a reasonably low natural frequency. The low frequency portion of the excitation to the product under test is principally due to the primary shaker module, with the low frequency vibrations being transmitted to the secondary shaker module through the coupling module. Thus, each of the modules is used to produce a segment of the overall vibration frequency spectrum, thereby enabling the test engineer to optimize the implementation of a selected module to produce only a portion of the vibration frequencies, rather than having to implement all of the vibration frequencies in a single module.

This concept is extensible to the use of additional shaker and coupling modules that are used to implement the multi-level vibration test system. Furthermore, the test engineer has available programmer elements that can be used in the primary shaker module, the coupling module, the secondary shaker module to shape the characteristic response of each of these elements to thereby precisely control the overall vibration frequency spectrum that is produced by the multi-level vibration test system.

DETAILED DESCRIPTION

There are numerous vibration test modes that are used in the vibration test industry. Among these are the Highly Accelerate Life Tests (HALT) that use very high levels of vibration excitation to excite all modes of vibration in the product under test in order to find design and process weak links. Additionally, Highly Accelerated Stress Screens (HASS) comprise vibration tests that use high levels of excitation to find process problems. What is needed for general HALT and HASS vibration applications is a vibration test system that generates low frequency (0–200 Hz) vibrations for some applications, high frequency (200–10,000 Hz) vibrations for other applications and broad band vibration frequencies (0–10,000 Hz) for still other applications.

Basic Architecture of Multi-Level Vibration Test System

Figure 1:
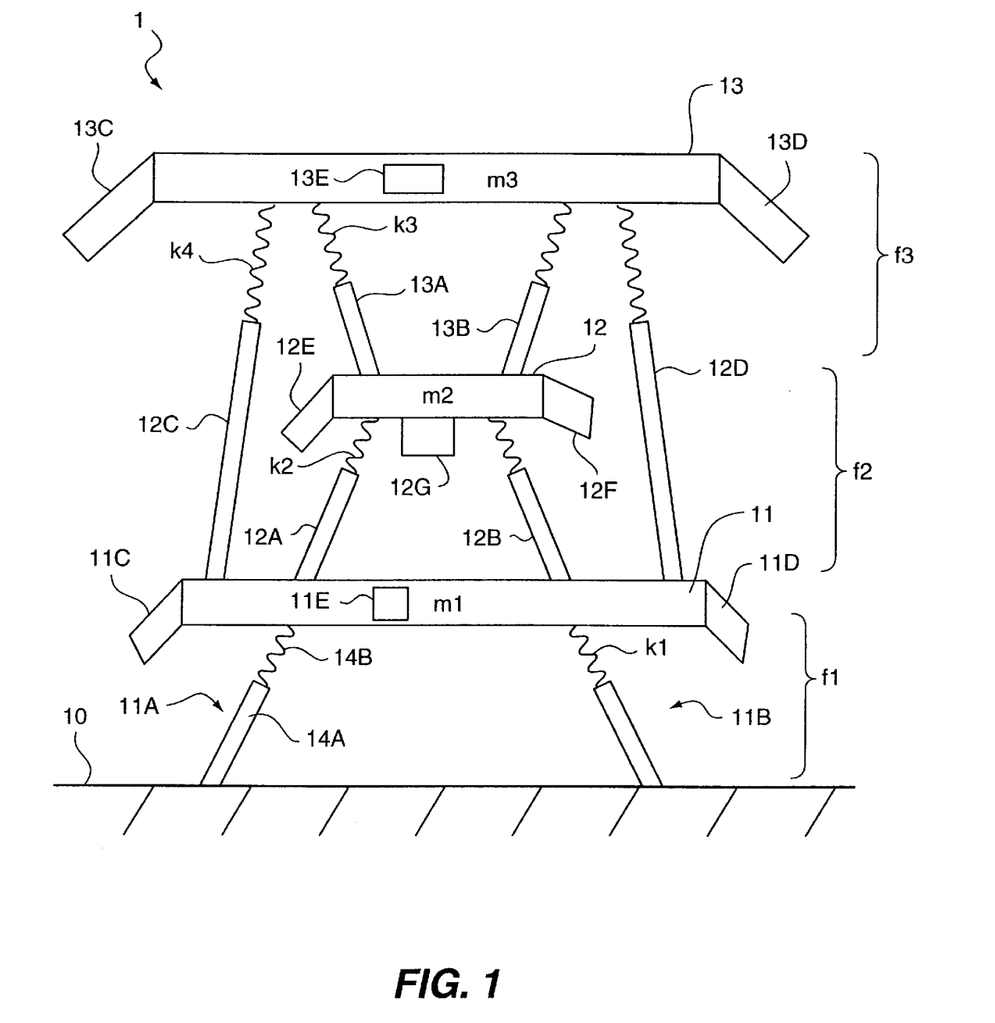
FIG. 1 illustrates in block diagram form the overall architecture of the present multi-level vibration test system.

FIG. 1 illustrates in block diagram form the overall architecture of the present multi-level vibration test system 1. In particular, the multi-level vibration test system 1 comprises a plurality of shaker modules 11–13, each of which is connected to other shaker modules and/or a base 10 by means of coupling modules 11A-11B, 12A–12D, 13A-13B, and including vibration input elements 11C-11D, 12E-12F, 13C-13D that comprise various elements used to generate vibrations of predetermined frequency and magnitude, as well as optional vibration shaping elements 11E, 12G, 13E that comprise passive elements that function to shape the characteristic of the vibrations that are generated. The coupling modules 11A-11B, 12A–12D, 13A-13B comprise any of a number of apparatus that can couple vibration frequencies and magnitudes between two elements, such as shaker modules 11–13, that are interconnected by the coupling modules 11A-11B, 12A–12D, 13A-13B. For example, the coupling modules 11A-11B, 12A–12D, 13A-13B can comprise hydraulic, pneumatic or electrodynamic actuators 14A that are either directly coupled or coupled through a spring and damper mechanism 14B to the shaker module 11. The spring and damper mechanism 14B provides a variable stiffness that serves to shape the excitation that is transmitted between the shaker modules 11–13 or between a shaker module 11 and a base 10 or seismic mass to which the shaker module 11 is attached. There can be interconnections between two adjacent shaker modules and/or between a shaker module and the base and/or among multiple shaker modules and/or among multiple shaker modules and the base. Thus, the shaker modules 11–13 can be configured into a multi-level vibration test system 1, with each level comprising at least one shaker module, which is connected to at least one other level of the multi-level vibration test system 1. In addition, the vibration input elements 11C-11D, 12E-12F, 13C-13D are active vibration generating elements that can comprise impactors, tuned impactors, rotary vibrators, bouncing balls, imbalance elements, and the like as described below. The vibration input elements 11C-11D, 12E-12F, 13C-13D are optionally connected to the various shaker modules 11–13 in the multi-level vibration test system 1. Furthermore, the multi-level vibration test system 1 can optionally include various passive vibration shaping elements 11E, 12G, 13E such as programmers, tuned absorbers, and the like that function to damp and excite various frequencies of vibration, as described in more detail below.

Figure 8:
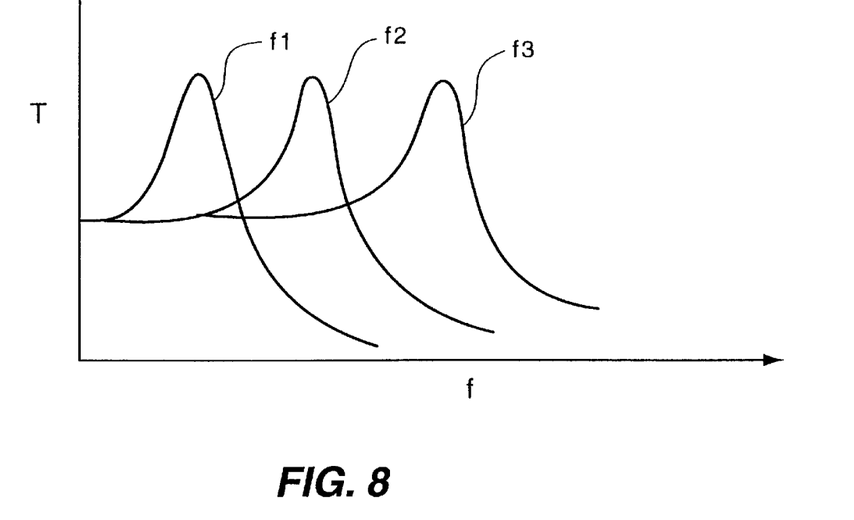
FIG. 8 illustrates a diagram of the characteristic response waveforms for each of the shaker modules of FIG. 1.

Thus, the interconnection of these various elements enable the user to precisely craft a desired vibration response in the multi-level vibration test system 1. In the simple case of each shaker module being interconnected with only the juxtaposed shaker module (the system of FIG. 1 without elements 12C and 12D), the representation of the characteristic response of the system can be calculated mathematically. This is illustrated in FIG. 8 where the characteristic response f1–f3 of the various levels of the multi-level vibration test system 1 are illustrated. These responses are a mapping of vibration magnitude versus frequency and can mathematically be approximated by the following relationships where f1<<f2<<f3:

$$f1 = \frac{1}{2\pi}\sqrt{\frac{k1}{m1+m2+m3}}$$

$$f2 = \frac{1}{2\pi}\sqrt{\frac{k2}{m2+m3}}$$

$$f3 = \frac{1}{2\pi}\sqrt{\frac{k3}{m3}}$$

As can be seen from the diagrams of FIG. 8, these three characteristic responses are a function of the spring constant k of the corresponding spring element as well as the masses of the shaker modules that receive the vibrations that are transmitted through that layer. The additive nature of these vibrations enable the user to shape the resultant characteristic system response by varying the individual components produced by the various layers.

While the term spring has been used herein, various combinations of spring and damping elements can be used to implement the spring function. These combinations shape the resonance and roll-off of the characteristic response by varying the damping. In addition, valve elements can be used in hydraulic damping systems to regulate the damping of the spring mechanism as can air bags, which can have adjustable stiffness and damping.

First Embodiment of the Interconnection of Two Shaker Modules

Figure 2:
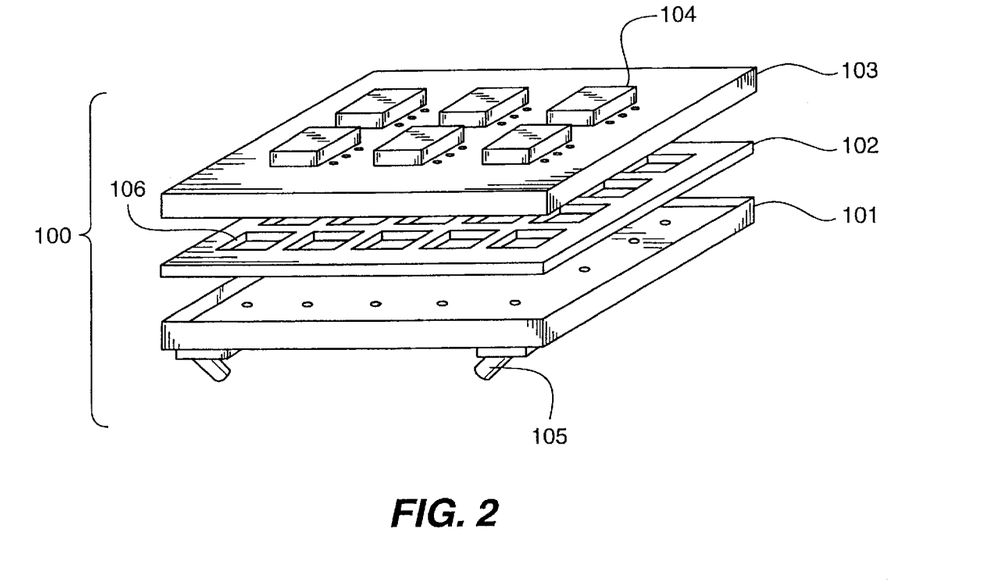
FIG. 2 illustrates a first exemplary interconnection of two shaker modules.

FIG. 2 illustrates in block diagram form the overall architecture of a first embodiment 100 of an interconnection of two shaker modules 101, 103 in the present multi-level vibration test system 1. This embodiment illustrates the concept of the invention and the extension to multiple layers (>2) and multiple shaker modules (>1) per layer represents a logical extension of the operation of the embodiment illustrated in FIG. 2.

The present multi-level vibration test system I satisfies all of the above-noted vibration test needs in one system. This is accomplished by the use of a "primary" shaker module 101 that is a low frequency six (or less) axis vibration system excited by actuators 105 comprising pneumatics, servo-hydraulics, electro-dynamics or mass imbalance, to which is coupled a "secondary" shaker module 103. The two shaker modules 101, 103 are interconnected by a coupling module 102 that comprises springs, pneumatic or elastomeric elements. If the primary shaker module 101 is hydraulically or pneumatically powered, the oil column or air column resonance provides a spring effect. The secondary shaker module 103 can be directly coupled to the primary actuators 105 or by springs as well. The actuators 105 can be implemented by means of well-known elastomeric or pneumatic elements. The springs are described herein since they tend to limit the vibration transfer to only the lower frequencies since the mass of the secondary shaker module 103 as mounted on the springs behaves like a mass on a spring excited by base excitation. This architecture provides a vibration resonance at a natural frequency while isolating the secondary shaker module 103 from frequencies above the square root of two times the resonant frequency. The transmissibility (ratio of response to input in the amplitude and frequency domain) below the resonant frequency is greater than unity, is a maximum at the resonant frequency and then rolls off to provide isolation from the base inputs higher than the square root of two times the resonant frequency.

The secondary shaker module 103, which can be thought of as a plate or fixture on which the product under test 104 is mounted, is equipped with apparatus that provides a direct excitation to the suspended secondary shaker module 103. This additional excitation can be inertially induced in the following ways: 1) attach pneumatic actuators to the secondary shaker module 103 and provide impacts which are shaped in the time domain by programmers, 2) provide imbalanced rotating parts and 3) provide a series of impacts by mechanical means such as masses impacting on the table, 4) provide tuned absorbers which respond to frequencies mostly near their natural frequency and then, when the response displacement is sufficient, impact the secondary shaker module 103 causing broad band vibration to be generated by the series of impacts.

The high frequency portion of the excitation to the product under test is provided by the secondary shaker module 103 being directly excited and is effectively isolated from the primary shaker module 101 by the fact that the primary spring/mass system noted above has a reasonably low natural frequency. The low frequency portion of the excitation to the product under test is principally due to the primary shaker module 101, with the low frequency vibrations being transmitted to the secondary shaker module 103 through the coupling module 102 Thus, each of the modules 101–103 is used to produce a segment of the overall vibration frequency spectrum, thereby enabling the test engineer to optimize the implementation of a selected module to produce only a portion of the vibration frequencies, rather than having to implement all of the vibration frequencies in a single module. This concept is extensible to the use of additional modules that are used to implement the multi-level vibration test system 1. Furthermore, the test engineer has available programmer elements that can be used in the primary shaker module 101, the coupling module 102, the secondary shaker module 103 to shape the characteristic response of each of these elements to thereby precisely control the overall vibration frequency spectrum that is produced by the multi-level vibration test system 1.

Primary Shaker Module

The primary shaker module 101 comprises a plate to which is attached at least one and more likely a plurality of actuators 105 that provide the energy input to create the vibration frequency spectrum for the primary shaker module 101. The primary shaker module 101 is typically supported by flexible supports that provide multi-directional freedom of movement over a predetermined range of motion. The actuators 105 are attached to the plate of the primary shaker module 101 in various selected orientations to generate multi-axial and multidirectional vibrations in the plate. Springs can be added between the plate and the hydraulics to thereby add low frequencies to high frequencies. The primary shaker module 101 can also be supported directly by pneumatic or hydraulic actuators. This basic architecture of the primary shaker module 101 is similar to that used by existing shaker table systems.

Secondary Shaker Module

Figure 4:
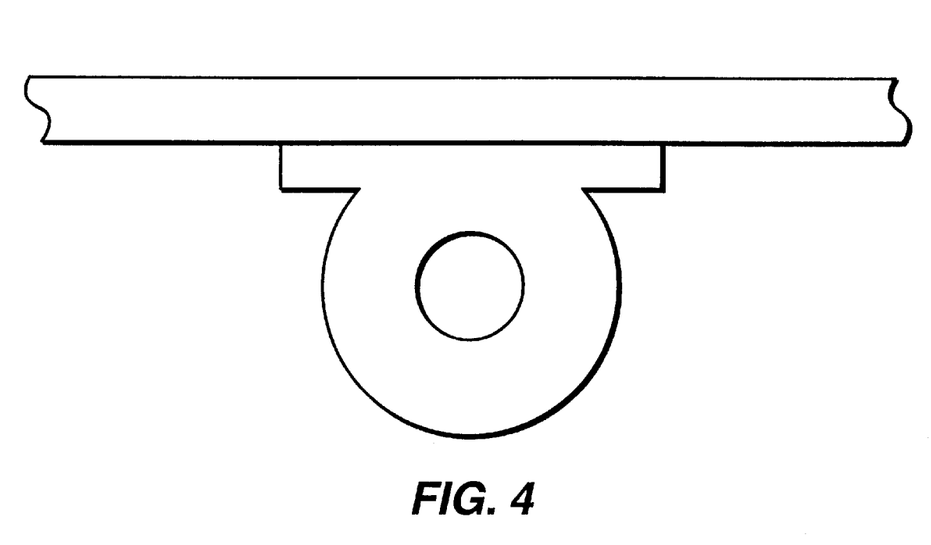
FIG. 4 illustrates in cross-section view the use of a rotary vibrator directly connected to a shaker module plate.

The secondary shaker module 103 comprises a plate that is used to mount the product under test 104 and to which is attached at least one and more likely a plurality of actuators that provide the energy input to create the vibration frequency spectrum for the secondary shaker module 103. The actuators can be connected between the secondary shaker module 103 and the coupling module 102, and/or between the secondary shaker module 103 and the primary shaker module 101, and/or directly connected to the secondary shaker module 103. For example, the directly connected actuator as shown in FIG. 4 can comprise a rotary motion vibrator, such as the Vibrolator® Vibrator manufactured by Martin Engineering Company. This rotary vibrator comprises a frame in which is mounted a migratory race that rotates in the opposite direction that the ball is traveling. The change in relative position of ball and race creates the vibration at low friction and wear characteristics.

Coupling Module

The coupling module 102 comprises an instrumentality that functions to transmit the vibration frequencies generated by the primary shaker module 101 to the secondary shaker module 103, typically with the additional input of shaping the vibration frequency spectrum that is transmitted. Thus, the coupling module 102 can comprise any individual element or combination of elements that are known in the vibration test system technology that performs the desired vibration transmission and shaping functions. The coupling module 102 can be a substantially rigid structure or a flexible structure, depending on the nature of the vibration coupling and shaping that is desired. For example, the coupling module 102 can be implemented by a honeycomb element that is comprised of a plurality of chambers 106 that are formed by the use of vertically oriented walls that interconnect an upper plate with a lower plate. The vertically oriented walls are typically formed of a rigid material, to provide a dynamically stiff coupling between the upper and lower plates over a frequency range of interest. The chambers that are formed can be uniform in dimensions or can vary over the extent of the length and width of the upper and lower plates. Thus, the degree of coupling between the upper and lower plates can vary over the cross-section of the coupling module 102.

Vibration Isolation

In addition to the vibration coupling function of the coupling modules, these modules can be designed to isolate vibrations of undesirable frequencies. The proper design of a spring or isolator element can significantly reduce the vibratory forces that are generated. For example, if a source generates a force of amplitude $F_s = F \sin \omega t$, the force that is transmitted through a spring and damper system that has a spring constant of k and a damper coefficient of c is given by the following equation:

$$F = \sqrt{(kX)^2 + (c\omega X)^2}$$

Where X is the amplitude of the vibration that is developed in response to the exciting force. Where the natural vibration frequency of this system is $\omega_n$, the transmissibility ($F/F_s$) of the force that is generated by the exciting source becomes less than unity when the ratio of the angular velocity of the source to the natural vibration frequency is greater than $\sqrt{2}$.

Given this characteristic, it becomes a problem to isolate low frequency disturbances, since the spring must then have a large static deflection to account for the disturbance. An alternative damping system comprises an air spring which comprises a bellows that are controlled by an air source connected thereto and storing a volume V of air at a pressure P. An air spring has a very low natural frequency and can effectively damp low frequency disturbances with only a small static displacement of x. If it is assumed that the bellows is a piston in a cylinder of area A, then dV/dx=−A. Likewise, the spring stiffness k is equal to the force per unit f displacement, which is given by k=A(dP/dx). Thus, in an air spring system, the spring stiffness is dependent on the displacement of the piston and is therefore nonlinear. However, the displacement is minimal and the spring stiffness is approximately $\gamma PA^2/N$ where the constant $\gamma$ is equal to 1.4 and is the specific heat for air. A very soft spring can therefore be created by increasing the volume of the system by means of an air storage tank connected to the bellows. If damping is desired in this system, a valve can be installed in the air line that connects the air storage tank with the bellows. This example of a spring system represents one of the many spring and damper embodiments that can be used with the multi-level vibration test system 1.

Free Mass Exciter

Figure 7:
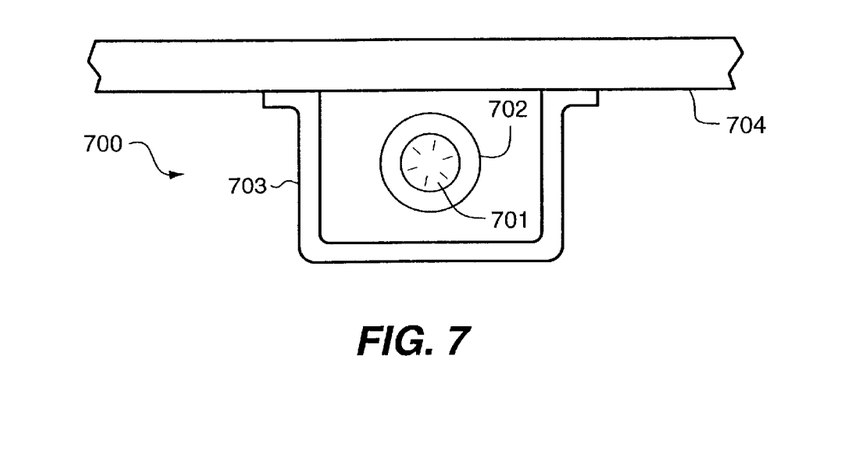
FIG. 7 illustrates a cross-section view of a typical free mass exciter.

The vibration frequency spectrum of the plate used in the modules 101–103 can be modified by the use of a free mass exciter that is shown in cross-section view in FIG. 7. The free mass exciter comprises a mass 701, such as a ball, that is free to move within a confined space, such as one of the chambers 106 of the honeycomb structure noted for the coupling module 102. Alternatively, the chamber 106 can be a single walled structure that is directly attached to a plate. In any case, the mass 701 moves within the confines of the chamber, impacting the walls 703 thereof to create impacts that generate random energy pulses. The frequency of impact and magnitude of the impact can be controlled by selecting the dimensions of the chamber, as well as the size, shape, rigidity and mass of the free mass 701. The free mass 701 can be an element of uniform cross section or can incorporate a surface layer 702 that encloses the mass 701 to thereby change the surface characteristics of the mass 701 and thereby its motion. The surface layer also acts as a programmer to shape the vibration spectrum that is generated by the action of the free mass exciter. The programmer layer can also be located on the chamber walls to shape the vibration spectrum that is generated by the action of the free mass exciter.

Tuned Absorbers

Figure 5:
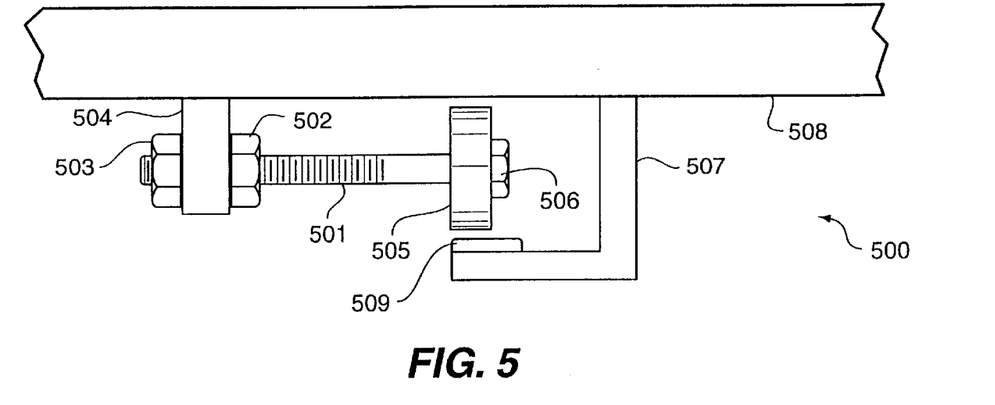
FIGS. 5 and 6 illustrate cross-section views of two embodiments of tuned absorbers.
Figure 6:
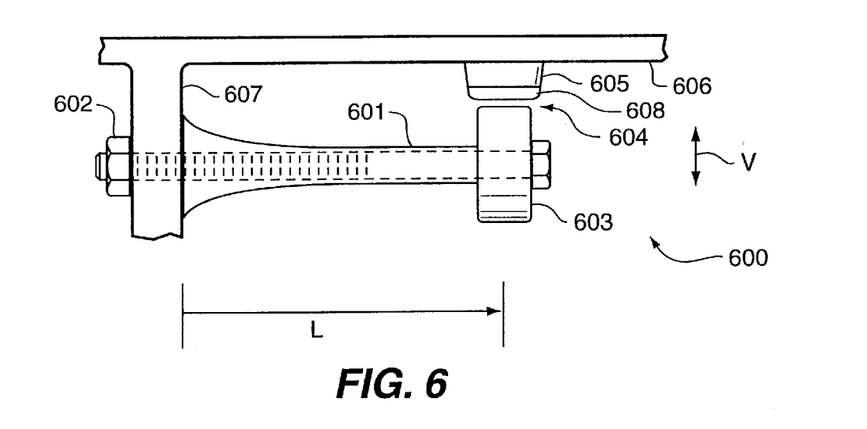

FIGS. 5 and 6 illustrate cross-section views of two embodiments of tuned absorbers that can be used to adjust the vibration frequency spectrum of the plate that is used to implement the primary shaker module 101, or secondary shaker module 103. The use of the tuned absorbers enable the test engineer to select the vibration frequencies that are produced and the table therefore has adjustable bandwidth.

In particular, as shown in FIG. 5, the tuned absorber 500 comprises the combination of an adjustable beam 501 and an adjustable stop 507 that are directly connected to the plate 508. The plate 508 transmits energy that is received from the actuators 105 (and/or the coupling module 102 or from additional vibration inputs from sources directly mounted on plate 508) and, in turn, beam 501 responds to that vibration, primarily at the natural frequency of beam 501. Therefore, the response of beam 501 is principally due to vibration at or near the resonant frequency of beam 501. The adjustable beam 501 is excited in a vertical mode so that the end of the adjustable beam 501 distal from the mounting member 504 vibrates in a vertical direction, indicated by arrow V. When enough energy is absorbed by the plate 508 and adjustable beam 501, the weight 505 that is affixed to the end of the adjustable beam 501 by nut 506 impacts the adjustable stop 507 to create a shock pulse, thereby creating a high frequency vibration spectrum. The length of the adjustable beam 501 can be adjusted by use of the nuts 502, 503 that enable the threaded rod that comprises the adjustable beam 501 to be lengthened or shortened. Similarly, the mass of the weight 505 that is removably mounted on the distal end of the adjustable beam 501 can be selected to create impacts of magnitude and frequency desired by the test engineer. The adjustable stop can comprise or include a programmer 509 to shape the vibration spectrum that is generated by the action of the tuned absorber. An alternate tuned absorber is shown in FIG. 6 and comprises the combination of an adjustable beam 601 and an adjustable stop 605 that are directly connected to the plate 606. The plate 606 transmits energy that is received from the actuators 105 (and/or the coupling module 102 or from additional vibration inputs from sources directly mounted on plate 606) and, in turn, beam 601 responds to that vibration, primarily at the natural frequency of beam 601. Therefore, the response of beam 601 is principally due to vibration at or near the resonant frequency of beam 601. The adjustable beam 601 is excited in a vertical mode so that the end of the adjustable beam 601 distal from the mounting member 607 vibrates in a vertical direction, indicated by arrow V. When enough energy is absorbed by the plate 606 and adjustable beam 601, the weight 604 that is affixed to the end of the adjustable beam 601 impacts the stop 605 to create a shock pulse, thereby creating a high frequency vibration spectrum. The length of the adjustable beam 601 can be adjusted by selecting a particular length beam element 601. The thickening at the end of the adjustable beam 601 where is attached to the mounting member 607 is provided to avoid a high stress concentration that would shorten the life of the tuned absorber. Similarly, the mass of the weight 604 that is removably mounted on the distal end of the adjustable beam 601 can be selected to create impacts of magnitude and frequency desired by the test engineer. The weight 604 can be implemented to include an adjustable nut 603 to thereby enable the adjustment of the range of vibration that is possible. The adjustable stop can comprise or include a programmer 608 to shape the vibration spectrum that is generated by the action of the tuned absorber.

Figure 9:
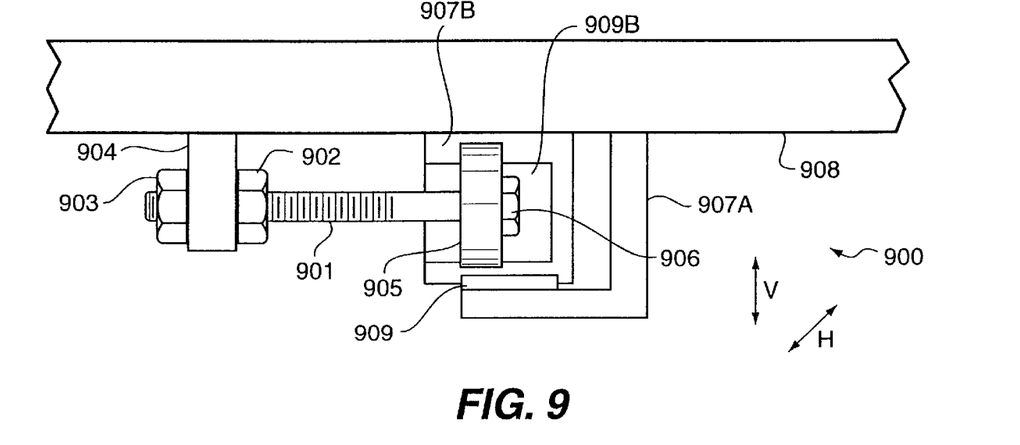
FIG. 9 illustrates a cross-section view of a tuned absorber that operates to control vibrations in multiple dimensions.

Alternatively, as shown in FIG. 9, the adjustable beam 901 can be rectangular in cross section and therefore have different resonant frequencies in two different (orthogonal) directions, as well as stops 907A, 907B and programmers 909A, 909B in both directions. Thus, in the vertical direction V the adjustable beam 901 can have a resonant frequency f1 while in an orthogonal direction H (perpendicular to the surface of FIG. 9) the adjustable beam 901 can have a resonant frequency f2, where f1≠f2. This enables the user to program the tuned absorber in both of the two orthogonal directions. As noted, the tuned absorber 900 comprises the combination of an adjustable beam 901 and an adjustable stop 907 that are directly connected to the plate 908. The plate 908 transmits energy that is received from the actuators 105 (and/or the coupling module 102 or from additional vibration inputs from sources directly mounted on plate 908) and, in turn, beam 901 responds to that vibration, primarily at the natural frequency of beam 901. Therefore, the response of beam 901 is principally due to vibration at or near the resonant frequency of beam 901. The adjustable beam 901 is excited so that the end of the adjustable beam 901 distal from the mounting member 904 vibrates in directions, indicated by arrows V, H. When enough energy is absorbed by the plate 908 and adjustable beam 901, the weight 905 that is affixed to the end of the adjustable beam 901 by nut 906 impacts the adjustable stops 907A,B to create a shock pulse, thereby creating a high frequency vibration spectrum. The length of the adjustable beam 901 can be adjusted by use of the nuts 902, 903 that enable the threaded rod that comprises the adjustable beam 901 to be lengthened or shortened. Similarly, the mass of the weight 905 that is removably mounted on the distal end of the adjustable beam 901 can be selected to create impacts of magnitude and frequency desired by the test engineer. The adjustable stops 907A,B can comprise or include a programmer 909A,B to shape the vibration spectrum that is generated by the action of the tuned absorber.

The tuned absorbers, if very lightly damped, respond very strongly to frequencies near to the resonant frequency of the absorber, but respond very little to other frequencies. This means that vibration energy input at the natural frequency of the absorber can be controlled by the response of the secondary shaker module 103 to the vibration energy input by the primary shaker module 101 at low frequencies. For example, assume that the tuned energy absorbers resonate at 100 Hz and that the damping of the absorbers is very small. In that case, the absorbers respond mostly to frequencies very near 100 Hz. Therefore, the primary shaker module response very near 100 Hz dictates the response of the absorbers. Therefore, the spectrum control at 100 Hz on the primary shaker module 101 essentially controls the response of the absorbers which, in turn, controls the broad band high frequency vibrations of the secondary shaker module 103. The input spectrum to the primary shaker module 101 can be reduced on both sides of 100 Hz in order to keep the spectrum on the primary shaker module 101 from becoming too high in that range.

Programmers

The operation of the shaker modules, coupling module, free mass exciters 700, and tuned absorbers 500, 600 described above can be modified by the use of programmers, such as 509, 608, 702. Programmers comprise coatings that have predetermined physical characteristics that change the bandwidth of the vibration frequencies that are produced. For example, the vibration frequency spectrum that results from the shock pulse generated by a loose ball or by a tuned resonator can be shaped by placing a programmer between the impacting mass and the table. For this purpose, Delrin® acetal resins are the preferred material. The Delrin acetal resins produced by Dupont are crystalline thermoplastic homopolymers made by the polymerization of formaldehyde. The beneficial characteristics of Delrin acetal resins are: high mechanical strength and rigidity, high fatigue endurance, high resistance to repeated impact, low coefficient of friction, excellent dimensional stability. For example, the walls of the chambers in the honeycomb plate can be coated with Delrin acetal resins and a lead ball placed inside the chamber and/or the ball itself can be coated with Delrin acetal resins. The test engineer can select certain areas of the table to emphasize and de-emphasize selected frequencies by the selection of which chambers to equip with the free mass, and/or the thickness of the associated coating(s) of Delrin acetal resins placed on the free mass and/or chamber walls. In the case of the tuned absorbers, the impact point for the adjustable beam can be coated with or implemented as a block of Delrin acetal resins.

Second Embodiment of the Interconnection of Two Shaker Modules

Figure 3:
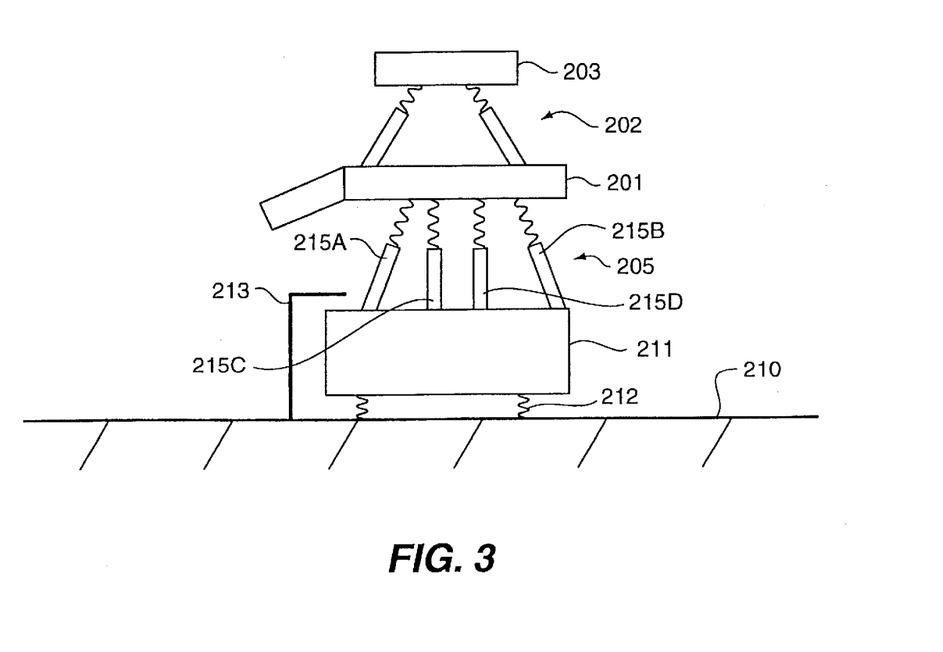
FIG. 3 illustrates a second exemplary interconnection of two shaker modules.

FIG. 3 illustrates in block diagram form the overall architecture of a second embodiment of an interconnection of two shaker modules in the present multi-level vibration test system 1. As with the multi-level vibration test system illustrated in FIG. 2, primary 201 and secondary 203 shaker modules are illustrated interconnected by coupling module 202, but the primary shaker module 201 is coupled to the base 210 by means of an intervening seismic mass 211. The coupling module 205 connects the primary shaker module 201 to the seismic mass 211, which itself is connected by coupling module 212 to the base 210. The seismic mass 211 can have its range of motion limited by the use of stops 213 that function to prevent over-excitation of the seismic mass 211. The coupling module 205 as illustrated comprises two sets of spring and damper elements, each set having different characteristics. Thus, elements 215A, 215B have a first set of vibration characteristics while elements 215C, 215D have a second set of vibration characteristics. In addition, the implementation of these elements can vary, for example the first set of elements 215A,B can be hydraulic while the second set of elements 215C,D can be pneumatic. The overall stiffness and damping characteristics and thus the transfer functions of the two sets of coupling elements are different. This enables the user to have a finer granularity of control over the vibration characteristics of the multi-level vibration system.

Summary

The above description illustrates some of the implementations of the various elements that are used in the multi-level vibration test system. There are numerous other embodiments of these elements that are possible, and the above examples are for the purpose of illustrating the concept of the present invention. Thus, the present multi-level vibration test system enables the test engineer to precisely implement a vibration environment that is applicable to a wide range of applications and performance characteristics. The architecture of multiple layers of shaker modules, coupling modules and the optional vibration input elements/vibration shaping elements, enable the test engineer to precisely control the vibration frequencies that are produced as well as their magnitudes.

What is claimed:

1. A multi-level vibration test system that is operational to subject a product under test to vibrations of predetermined frequencies, comprising:

a plurality of shaker modules, each supporting vibrations at a predetermined set of frequencies, at least two of said plurality of shaker modules including at least one actuator connected to said shaker module for generating an impulse force to initiate vibrations at a predetermined set of frequencies;

means for non-rigidly coupling said initiated vibrations among said plurality of shaker modules to create a composite vibration of predetermined frequencies and magnitudes.

2. The vibration test system of claim 1 wherein a one of said plurality of shaker modules comprises:

a fixture on which said product under test is mounted.

3. The vibration test system of claim 1 further comprising:

means, affixed to at least one of said plurality of shaker modules, for adjusting vibration characteristics of said at least one of said plurality of shaker modules.

4. The vibration test system of claim 3 wherein said means for adjusting vibration characteristics comprises:

tuned absorber means connected to said at least one of said plurality of shaker modules for vibrating in response to vibration of said at least one of said plurality of shaker modules at frequencies near a natural resonant frequency of said tuned absorber means to thereby impact said at least one of said plurality of shaker modules to cause broad band vibration to be generated by said impact.

5. The vibration test system of claim 4 wherein said tuned absorber means comprises:

an adjustable beam means, directly connected to said at least one of said plurality of shaker modules, for vibrating in response to vibration of said at least one of said plurality of shaker modules; and an adjustable stop means, directly connected to said at least one of said plurality of shaker modules a predetermined adjustable distance from said adjustable beam means when said adjustable beam means is devoid of vibration, for impacting said adjustable beam means when said adjustable beam means vibrates a displacement equal to said predetermined adjustable distance.

6. The vibration test system of claim 5 wherein said tuned absorber means further comprises:

programmer means located between said adjustable beam means and said adjustable stop means for shaping a vibration spectrum of said impact of said adjustable beam means with said adjustable stop means.

7. The vibration test system of claim 3 wherein said means for adjusting vibration characteristics comprises:

free mass exciter means comprising a mass extant in a predetermined volume and responsive to vibration of said at least one of said plurality of shaker modules for impacting walls of said volume to cause broad band vibration to be generated by said impact.

8. The vibration testsystem of claim 7 wherein said means for adjusting vibration characteristics further comprises:

programmer means covering at least one of a surface of said mass and said walls of said volume for shaping a vibration spectrum of said impact.

9. The vibration test system of claim 1 wherein said means for non-rigidly coupling said initiated vibrations comprises:

means for interconnecting at least two of said plurality of shaker modules; and means for adjusting vibration transfer characteristics of said means for interconnecting.

10. The vibration test system of claim 1 wherein said means for non-rigidly coupling said initiated vibrations comprises:

means for interconnecting at least one of said plurality of shaker modules with a seismic mass; and means for adjusting vibration transfer characteristics of said means for interconnecting.

11. The vibration test system of claim 1 wherein said means for non-rigidly coupling said initiated vibrations comprises:

means for interconnecting at least one of said plurality of shaker modules with a base; and means for adjusting vibration transfer characteristics of said means for interconnecting.

12. A multi-level vibration test system that is operational to subject a product under test to vibrations of predetermined frequencies, comprising:

a primary shaker module, for producing vibrations at a first predetermined set of frequencies, including at least one actuator connected to said primary shaker module for generating an impulse force to initiate vibrations at said first predetermined set of frequencies;

a secondary shaker module, for producing vibrations at a second predetermined set of frequencies, including at least one actuator connected to said secondary shaker module for generating an impulse force to initiate vibrations at said second predetermined set of frequencies; and means for non-rigidly coupling said initiated vibrations from said primary shaker module to said secondary shaker module to create a composite vibration of predetermined frequencies and magnitudes.

13. The vibration test system of claim 12 wherein said secondary shaker module comprises:

a fixture on which said product under test is mounted.

14. The vibration test system of claim 13 wherein at least one of said primary shaker module, said secondary shaker module further comprises:

means, connected to said at least one of said primary shaker module, said secondary shaker module, for adjusting vibration characteristics of said at least one of said primary shaker module, said secondary shaker module.

15. The vibration test system of claim 14 wherein said means for adjusting comprises:

tuned absorber means for vibrating in response to vibration of said at least one of said primary shaker module, said secondary shaker module, at frequencies near a natural resonant frequency of said tuned absorber means to thereby impact said at least one of said primary shaker module, said secondary shaker module, to cause broad band vibration to be generated by said impact.

16. The vibration test system of claim 15 wherein said tuned absorber means comprises:

an adjustable beam means, directly connected to said at least one of said primary shaker module, said secondary shaker module, for vibrating in response to vibration of said at least one of said primary shaker module, said secondary shaker module; and an adjustable stop means, directly connected to said at least one of said primary shaker module, said secondary shaker module, a predetermined adjustable distance from said adjustable beam means when said adjustable beam means is devoid of vibration, for impacting said adjustable beam means when said adjustable beam means vibrates a displacement equal to said predetermined adjustable distance.

17. The vibration test system of claim 16 wherein said tuned absorber means further comprises:

programmer means located between said adjustable beam means and said adjustable stop means for shaping a vibration spectrum of said impact of said adjustable beam means with said adjustable stop means.

18. The vibration test system of claim 14 wherein said means for adjusting comprises:

free mass exciter means comprising a mass extant in a predetermined volume and responsive to vibration of said at least one of said primary shaker module, said secondary shaker module, for impacting walls of said volume to cause broad band vibration to be generated by said impact.

19. The vibration testsystem of claim 18 wherein said free mass exciter means further comprises:

programmer means covering at least one of a surface of said mass and said walls of said volume for shaping a vibration spectrum of said impact.

20. The vibration test system of claim 12 wherein said means for non-rigidly coupling said initiated vibrations comprises:

means for interconnecting said primary shaker module and said secondary shaker module; and means for adjusting vibration transfer characteristics of said means for interconnecting.

21. The vibration test system of claim 12 further comprising:

means for interconnecting said primary shaker module with a seismic mass; and means for adjusting vibration transfer characteristics of said means for interconnecting.

22. The vibration test system of claim 12 wherein said means for coupling vibrations comprises:

means for interconnecting said primary shaker module with a base; and means for adjusting vibration transfer characteristics of said means for interconnecting.

23. A vibration test system that is operational to subject a product under test to vibrations of predetermined frequencies, comprising:

a base;

a shaker module on which said product under test is mounted;

at least one actuator connected to said shaker module and said base for generating a force to initiate vibrations at a first predetermined set of frequencies;

at least one actuator exclusively connected to said shaker module for generating a force to initiate vibrations at a second predetermined set of frequencies; and means for non-rigidly coupling said initiated vibrations of the first and second predetermined set of frequencies to created a composite vibration of predetermined frequencies and magnitude.

24. The vibration test system of claim 23 further comprising:

a fixture, on which said product under test is mounted.

25. The vibration test system of claim 23 further comprising:

means, affixed to said shaker module, for adjusting vibration characteristics of said shaker module.

26. The vibration test system of claim 25 wherein said means for adjusting vibration characteristics comprises:

tuned absorber means connected to said shaker module for vibrating in response to vibration of said shaker module at frequencies near a natural resonant frequency of said tuned absorber means to thereby impact said shaker module to cause broad band vibration to be generated by said impact.

27. The vibration test system of claim 26 wherein said tuned absorber means comprises;

an adjustable beam means, connected to said shaker module, for vibrating in response to vibration of said shaker module; and an adjustable stop means, connected to said shaker module a predetermined adjustable distance from said adjustable beam means when said adjustable beam means is devoid of vibration, for impacting said adjustable beam means when said adjustable beam means vibrates a displacement equal to said predetermined adjustable distance.

28. The vibration test system of claim 27 wherein said tuned absorber means further comprises:

programmer means located between said adjustable beam means and said adjustable stop means for shaping a vibration spectrum of said impact.

29. The vibration test system of claim 25 wherein said means for adjusting vibration characteristics comprises:

free mass exciter means comprising a mass extant in a predetermined volume and responsive to vibration of said shaker module means for impacting walls of said volume to cause broad band vibration to be generated by said impact.

30. The vibration test system of claim 29 wherein said means for adjusting vibration characteristics further comprises:

programmer means covering at least one of a surface of said mass and said walls of said volume for shaping a vibration spectrum of said impact.

31. The vibration test system of claim 23 wherein said means for non-rigidly coupling said initiated vibrations comprises:

means for interconnecting said shaker module and said base; and means for adjusting vibration transfer characteristics of said means for interconnecting.

32. The vibration test system of claim 23 wherein said means for non-rigidly coupling said initiated vibrations comprises;

means for interconnecting said shaker module with a seismic mass; and means for adjusting vibration transfer characteristics of said means for interconnecting.

* * * * *